Aug. 23, 1932.     M. F. CARR     1,873,871
SNAP FASTENER STUD AND INSTALLATION THEREOF
Filed Jan. 14, 1931
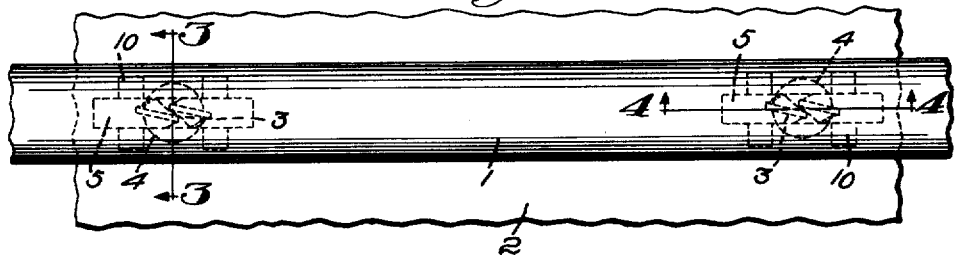
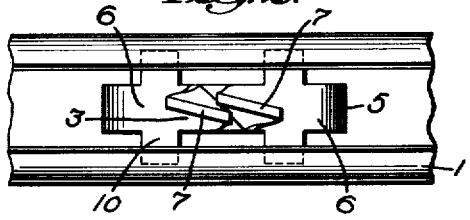 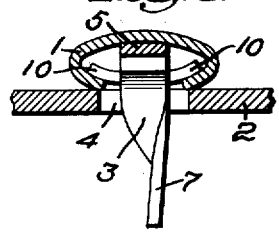
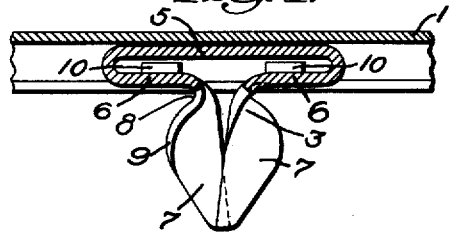 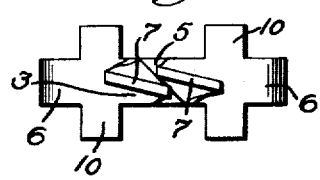
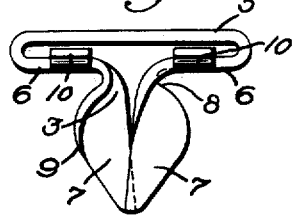 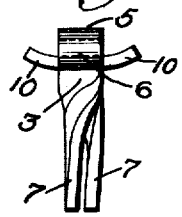
Inventor:
Moses F. Carr Patented Aug. 23, 1932

1,873,871

UNITED STATES PATENT OFFICE

MOSES F. CARR, OF LEXINGTON, MASSACHUSETTS, ASSIGNOR TO UNITED-CARR FASTENER CORPORATION, OF CAMBRIDGE, MASSACHUSETTS, A CORPORATION OF MASSACHUSETTS

SNAP FASTENER STUD AND INSTALLATION THEREOF

Application filed January 14, 1931. Serial No. 508,656.

My invention aims to provide improvements in snap fastener studs and installations thereof.

In the drawing which illustrates a preferred embodiment of my invention:—

Figure 1 is a plan view of a trim strip installation showing the use of my improved stud members as they appear in dotted line positions;

Fig. 2 is an under side view of a portion of the trim strip and one of the snap fastener studs;

Fig. 3 is a section taken on the line 3—3 of Figure 1;

Fig. 4 is a section taken on the line 4—4 of Figure 1, the supporting structure being omitted;

Fig. 5 is a plan view of a stud member;

Fig. 6 is a side elevation of the stud member; and

Fig. 7 is an end elevation of the stud member.

Referring to the embodiment of my invention as illustrated by the annexed drawing, I have shown a sheet metal snap fastener stud member used in connection with securing a sheet metal trim strip to a sheet metal supporting structure, thereby to cover a seam in the supporting structure or to provide a finished appearance thereto.

The particular installation selected for illustration by the drawings includes (Figs. 1 and 3) a hollow sheet metal trim strip 1 attached to a supporting structure 2 by means of separable snap fastener stud members 3. The stud members pass through apertures 4 in the supporting structure 2 and engage the wall surrounding the aperture 4, thereby holding the parts is assembled relation. The trim strip is of a well known construction being formed from a single sheet of metal and having its longitudinal edges folded under and terminating in substantial spaced relation to each other, as shown in Figs. 2 and 3.

The particular snap fastener stud member which I have selected for illustration is formed from a single piece of sheet metal and has a base which includes a flat, narrow portion 5 from the ends of which extend inwardly and in spaced relation thereto yieldable portions 6—6. At the inner end of each portion 6, the metal is bent so that it extends at a right angle to the base thereby providing two projections 7—7 each of which is twisted (Figs. 5, 6 and 7) adjacent to its point of connection with the portion 6 so that they overlap slightly and present edges which form a neck 8 and an enlarged head 9. The stud member may be said to be of the "scissors-like" type since the projections 7—7 overlap each other and act somewhat in the same manner as scissors during their engagement with and disengagement from cooperating socket means. The projections 7—7 are relatively rigid throughout their length and contraction of the head is permitted by the inwardly bent portions 6—6 of the base which may yield toward and away from that portion 5 of the base. The base is relatively narrow in order to insure the proper resiliency and, therefore, I have provided on each portion 6 two laterally extending wings 10 for frictional contact with the inwardly bent edge portions of the trim strip 1, as shown in Figs. 2 and 3.

When the snap fastener studs are attached to the trim strip 1 the portion 5 of the base contacts with the inner surface of the strip and the wings 10 contact with the inner surfaces of the inwardly bent portions (Fig. 3) and the projections 7—7 extend through the space between the edges of the strip and into engagement with the supporting structure 2, thereby holding the strip securely in position. In order to align the projections 7—7 of the stud member with an aperture 4 in the supporting structure 2, it is sometimes desirable to shift the fastener element longitudinally with relation to the strip. This may be readily accomplished by squeezing together the projections 7—7 thereby forcing the portions 6—6 of the base toward the portion 5 to loosen the engagement between the stud and the strip. Then the stud member may be shifted readily and upon release of the pressure upon the projections 7—7 the portions 6—6 of the base will spring outwardly away from the portion 5 and cause the portion 5 of the base and wings 10 to engage the strip under a substantial tension. In this manner, each stud member is held in a given position with relation to the trim strip against accidental movement.

My improved snap fastener members are strong, durable and easy to manufacture since they are stamped from a strip of metal into the desired form and furthermore are particularly adapted for use in connection with trim strips, because they may be easily attached thereto, no other part being necessary in connection with the installation. Furthermore, a fastener may be easily adjusted with relation to the trim strip.

While I have illustrated and described a preferred embodiment of my invention, I do not wish to be limited thereby because the scope of my invention is best defined by the following claims.

1. A trim strip structure comprising in combination, a hollow metal trim strip, a snap fastener member having a base carried by and adjustable relative to said strip, spring means forming an integral part of the fastener member and expanding said fastener against the inner walls of said strip to hold said fastener against the inner walls of said strip to hold the fastener in position against accidental movement relative to the strip and yieldable socket-engaging elements extending from said spring means through the inner face of said strip for attaching the strip in position, and said fastener member being adapted to be adjusted relative to the strip by squeezing the socket-engaging elements toward each other thereby to contract the spring means and permit it to slide relative to the strip.

2. A trim strip structure comprising, in combination, a hollow metal trim strip folded from sheet metal and having its edges terminating in spaced relation at the inner face, a snap fastener member carried by and adjustable relative to said strip, said fastener member having a folded yieldable base one portion of which engages the inner face of the strip and having laterally extending fingers yieldably engaging the strip adjacent the edges at the inner face of the strip, said laterally extending fingers cooperating with the base of the fastener to hold the fastener in position against accidental movement relative to the strip and yieldable socket-engaging elements extending from said base through the inner face of said strip for attaching the strip in position and said fastener member being adapted to be adjusted relative to the strip by squeezing the socket-engaging elements toward each other thereby to contract the base and permit it to slide relative to the strip.

3. A snap fastener stud having a base having inwardly bent yielding portions, a plurality of bearing members extending from said yielding portions, and a projection extending at right angles to the base at the inner end of each of said yielding portions of the base, said projections being twisted adjacent the yielding portions as and for the purposes illustrated and described.

4. A snap fastener stud having a base having inwardly bent yielding portions, a projection extending at right angles to the base at the inner end of each of said yielding portions of the base, said projections being twisted adjacent the yielding portions as and for the purposes illustrated and described, and said inwardly bent portions having laterally extended wing portions for gripping contact with a part to which the fastener stud may be attached.

5. A one-piece sheet metal snap fastener stud having a base having inwardly bent yielding portions, bearing members extending laterally from said yielding portions, a projection extending from each of said yielding portions, said projections being shaped to enter and make snap fastening engagement with a cooperating fastener socket and being adapted to move toward and away from each other due to the flexibility of said yielding portions.

6. A one-piece sheet metal snap fastener stud having a base having inwardly bent yielding portions, bearing members extending laterally from said yielding portions, a projection extending from each of said yielding portions and having edge portions shaped to enter and make fastening engagement with a cooperating fastener socket, and said projections being adapted to move toward and away from each other due to the flexibility of said base so that the said projections may snap into and out of engagement with the said socket, and said projections being twisted adjacent to their connections with the yielding portions so that said projections may have a scissors-like action for engagement and disengagement with a fastener socket.

7. A snap fastener stud having a base having inwardly bent yielding portions, bearing members extending laterally from said yielding portions, a pair of projections extending from the inwardly bent portions of said base and said projections being rigid throughout their lengths, shoulders provided on said projections whereby they may be separably engaged with a cooperating fastener socket and said inwardly bent portions of said base being resilient to permit movement of said projections toward and away from each other so that said shoulders may pass into and out of engagement with the socket when the stud is being engaged with or disengaged from a socket and also being resilient to permit said bearing members to move toward and away from the remainder of said base to be released from or engaged with a part to which the fastener stud is to be attached.

In testimony whereof, I have signed my name to this specification.

MOSES F. CARR.

CERTIFICATE OF CORRECTION.

Patent No. 1,873,871.                           August 23, 1932.

MOSES F. CARR.

It is hereby certified that error appears in the printed specification of the above numbered patent requiring correction as follows: Page 1, line 39, for "is" read in; page 2, lines 37 and 38, claim 1, strike out the words "said fastener against the inner walls of said strip to hold"; and that the said Letters Patent should be read with these corrections therein that the same may conform to the record of the case in the Patent Office.

Signed and sealed this 22nd day of November, A. D. 1932.

(Seal)

M. J. Moore,
Acting Commissioner of Patents.

tions toward and away from each other so that said shoulders may pass into and out of engagement with the socket when the stud is being engaged with or disengaged from a socket and also being resilient to permit said bearing members to move toward and away from the remainder of said base to be released from or engaged with a part to which the fastener stud is to be attached.

In testimony whereof, I have signed my name to this specification.

MOSES F. CARR.

CERTIFICATE OF CORRECTION.

Patent No. 1,873,871.                                                August 23, 1932.

MOSES F. CARR.

It is hereby certified that error appears in the printed specification of the above numbered patent requiring correction as follows: Page 1, line 39, for "is" read in; page 2, lines 37 and 38, claim 1, strike out the words "said fastener against the inner walls of said strip to hold"; and that the said Letters Patent should be read with these corrections therein that the same may conform to the record of the case in the Patent Office.

Signed and sealed this 22nd day of November, A. D. 1932.

(Seal)                                                                                 M. J. Moore,
Acting Commissioner of Patents.

CERTIFICATE OF CORRECTION.

Patent No. 1,873,871.                                                      August 23, 1932.

MOSES F. CARR.

It is hereby certified that error appears in the printed specification of the above numbered patent requiring correction as follows: Page 1, line 39, for "is" read in; page 2, lines 37 and 38, claim 1, strike out the words "said fastener against the inner walls of said strip to hold"; and that the said Letters Patent should be read with these corrections therein that the same may conform to the record of the case in the Patent Office.

Signed and sealed this 22nd day of November, A. D. 1932.

(Seal)

M. J. Moore,
Acting Commissioner of Patents.